US007191193B2

(12) United States Patent
Ben-Yaacov et al.

(10) Patent No.: US 7,191,193 B2
(45) Date of Patent: Mar. 13, 2007

(54) AUTOMATIC DIGITAL MUSIC LIBRARY BUILDER

(75) Inventors: Yaacov Ben-Yaacov, Douglasville, GA (US); Boaz Ben-Yaacov, Douglasville, GA (US)

(73) Assignee: Catch Media, Douglasville, GA (US)

( * ) Notice: Subject to any disclaimer, the term of this patent is extended or adjusted under 35 U.S.C. 154(b) by 133 days.

(21) Appl. No.: 10/336,443

(22) Filed: Jan. 2, 2003

(65) Prior Publication Data

US 2004/0131255 A1 Jul. 8, 2004

(51) Int. Cl.
G17F 17/30 (2006.01)

(52) U.S. Cl. .......................... 707/104.1; 707/10; 369/7

(58) Field of Classification Search ................ 707/1, 707/10, 104.1; 725/86, 89; 84/609; 382/172; 369/7

See application file for complete search history.

(56) References Cited

U.S. PATENT DOCUMENTS

| 5,892,536 | A  | * | 4/1999  | Logan et al. ................. 725/34 |
| 6,088,455 | A  |   | 7/2000  | Logan et al. |
| 6,389,162 | B2 | * | 5/2002  | Maeda ........................ 382/172 |
| 6,449,367 | B2 | * | 9/2002  | Van Wie et al. ............ 380/232 |
| 6,463,444 | B1 | * | 10/2002 | Jain et al. ................ 707/104.1 |
| 6,608,930 | B1 | * | 8/2003  | Agnihotri et al. ........... 382/176 |
| 6,834,308 | B1 |   | 12/2004 | Ikezoye et al. |
| 2001/0018693 | A1 |   | 8/2001  | Jain et al. |
| 2002/0015362 | A1 |   | 2/2002  | Cowgill et al. |
| 2002/0100062 | A1 |   | 7/2002  | Lowthert et al. |
| 2002/0138852 | A1 | * | 9/2002  | Reynolds et al. ........... 725/136 |
| 2003/0021441 | A1 | * | 1/2003  | Levy et al. ................. 382/100 |
| 2003/0076955 | A1 |   | 4/2003  | Alve et al. |
| 2003/0158737 | A1 |   | 8/2003  | Csicsatka |
| 2003/0163823 | A1 | * | 8/2003  | Logan et al. ................. 725/89 |
| 2003/0233929 | A1 | * | 12/2003 | Agnihotri ..................... 84/609 |

FOREIGN PATENT DOCUMENTS

| EP | 1251440 A2 | * 10/2002 |
| EP | 1 304 874 A2 | 4/2003 |
| WO | WO 01/46783 A2 | 6/2001 |
| WO | WO 01/062004 A | 8/2001 |
| WO | WO 03/058410 A | 7/2003 |

OTHER PUBLICATIONS

"Gotuit Media Secures $2.1 Million in First-Round Angel Funding Led by Topol Group", PR Newswire, pNA, Aug. 15, 2000.*

(Continued)

*Primary Examiner*—Leslie Wong
(74) *Attorney, Agent, or Firm*—Blakely, Sokoloff, Taylor & Zafman LLP

(57) ABSTRACT

A digital music library builder including an analog-to-digital converter for converting analog audio into digital audio, an optical character processor for recognizing characters within an image, a meta-data extractor for identifying meta-data for a song within the recognized characters, an audio parser for marking the start and end of a song within the digital audio, and a database manager for associating the identified meta-data with the marked song, within a digital music library. A method is also described and claimed.

69 Claims, 13 Drawing Sheets

OTHER PUBLICATIONS

Amazon.com Description, "HP Jordana 545 Pocket PC," XP002336991, Internet Article, Online!, retrieved from the Internet: http://www.pdasupport..com/Jordana545.htm> (Apr. 2000).

J. Haitsma, T. Kalker, "A highly Robust Audio Fingerprinting System," XP002347090, IRCAM, Online!, retrieved from the internet: http://ismir2002.ismir.net/proceedings/02-FP04-2.pdf (2002).

M. Nilsson, "ID3 tag version 2.4.0—Native Frames," XP002350036, ID3V2.4.0-frames.txt, v 1.1. Retrieved from the Internet: http:www/id3.org/id3v2.4.0-frames.txt (Nov. 1, 2000).

International Search Report for counterpart PCT Application No. PCT/IL2003/001109 (search report mailed Nov. 14, 2004).

* cited by examiner

AUTOMATIC DIGITAL MUSIC LIBRARY BUILDER

FIELD OF THE INVENTION

The present invention relates to automatic generation of digital music libraries, such as MP3 libraries.

BACKGROUND OF THE INVENTION

Digital music players are proliferating as standalone consumer electronic devices, such as MP3 players, as bundled components within portable devices such as personal data assistants (PDAs) and cell-phones, and as home network appliances. Listeners typically build up their own personal libraries of digital songs, which are stored on memory units such as hard disk drives and removable memory cards. Digital songs are typically acquired through the Internet via subscription services and peer-to-peer exchanges, or by converting songs from a compact disc (CD) into a library.

Digital songs typically include audio data and peripheral data, referred to as meta-data, used to index the songs within the listener's library. For example, within an MP3 file meta-data is accessed through an ID3Tag. By indexing the songs, a listener can search his library and access individual songs therein. Typically audio players provide a user interface through which users view meta-data.

Reference is now made to FIG. 1, which is a prior art illustration of a user interface for a Windows media player, indicating meta-data displayed within a window frame 110, and an index for accessing individual songs, displayed within a window frame 120.

Building up a digital music library requires a lot of work. Typically, the listener first searches the Internet for one or more songs of interest, identifies locations of the songs, and downloads them into a database associated with a media player. Songs are typically stored as digital files, formatted in compliance with a standard format, such as MP3 or WMA. Once the songs are downloaded, the listener typically uses software such as Windows Media player (WMP) or Winamp to play the songs on a computer, or alternatively he uses a hardware device, such as an Ipod or MPEG player, to play the songs. WMA files embed meta-data within the files, and also within the filenames themselves.

Often individuals spend nights on end downloading their favorite songs and building their own personal music libraries. Downloading music files from the Internet may infringe copyrights, unless the files are obtained through a service that pays royalties to the recording industry.

A shortcoming in the digital music world is the large effort required to build custom music libraries. An alternative is to either purchase libraries that have been prepared by others, but often someone else's library does not match a listener's taste, and he prefers to collect his own favorite songs.

A popular source for a listener to hear his favorite songs is on music stations. Cable, satellite broadcast and the Internet provide music channels for almost every genre of music—classical music, rock and roll, jazz, music of the 80's, etc. A listener can enjoy music according to his taste by subscribing to such broadcast services.

Ideally, a listener building up his personal digital music library would like to be able to record his favorite songs from such broadcast services. However, raw audio recording from a music station does not contain the meta-data necessary to incorporate such songs into a digital music library. Using today's technology, a listener has no choice but to painstakingly label each such song recorded from a music station with appropriate meta-data—a process that can last hours in order to build even a modest library with a few hundred songs.

SUMMARY OF THE INVENTION

The present invention enables a listener to easily build a digital library of music, which is cataloged and easily accessible for personal playback. The present invention provides a solution for the tens of millions of households in the U.S. and around the world that receive, either through digital cable or over Direct Broadcast Satellite (DBS) transmissions, music channels such as Music Choice, DMX and other commercial free music services. Such music channels are currently broadcast as video and audio channels in which the audio feed includes a song being played, and typically the simultaneous video feed has information about the song, its artists, and the label whose song is being broadcast.

In a preferred embodiment, a device utilizing the present invention, referred to hereinafter as a "Family Music Center," is connected to a digital cable box or digital satellite receiver, in the same fashion that a video cassette recorder (VCR) or personal video recorder (PVR) is connected; namely, by connecting the left and right audio and video outputs of the receiver to the device. Preferably, the Family Music Center has the ability to record and to playback by category, much like a PVR. Whereas a PVR relies on data received through an electronic program guide to identify what it is recording, and to name the recorded shows, the Family Music Center utilizes information in the video portion of the broadcast to identify what is being recorded.

In a preferred embodiment, a device utilizing the present invention, referred to hereinafter as a "Family Music Center," is connected to a digital cable box or digital satellite receiver, in the same fashion that a video cassette recorder (VCR) or personal video recorder (PVR0 is connected; namely, by connecting the left and right audio and video outputs of the receiver to the device. Preferably, the Family Music Center has the ability to record and to playback by category, much like a PVR. Whereas a PVR relies on data received through an electronic program guide to identify what it is recording, and to name the recorded shows, the Family Music Center utilizes information in the video portion of the broadcast to identify what is being recorded.

In a preferred embodiment, the Family Music Center allows a listener to record in either "record all" mode or "selective mode". In "record all" mode the listener sets his receiver to a music channel broadcasting a genre of music that he enjoys, and then he presses a record button on the Family music Center. The Family music Center then records and categorizes all songs played during the recording period, until the listener either stops the recording process by pressing stop on the Family music Center, or changes the channel on his receiver.

In a preferred embodiment of the present invention, the Family music Center records each song once, and, if a song is broadcast more than once, the Family music Center marks the song as being virtually recorded an additional time, for each time the song is re-broadcast. It may thus be appreciated that in this fashion the Family music Center builds a personal digital music library for the listener. Assuming that an average song lasts approximately three minutes and assuming a 25% re-broadcast rate, it may be appreciated that the Family music Center records approximately 360 songs during a typical 24 hour day of operation. Thus in approximately a one week period of recording day and night, the Family Music Center builds a library of over 2,500 songs, if left on one specific genre channel. In many cases a listener records only at night when he is asleep, since the recording process requires the receiver to be set to a music channel while recording, and if the listener wants to watch television he will inherently change the viewing channel from the music channel. Thus in a household with average daily television viewing, a library of over 2,500 songs for a specific genre is built by the Family Music Center within two weeks.

In "selective mode" the Family Music Center is set to record a specific artist or song, and then when that artist or song is broadcast the Family Music Center records the music. The "selective mode" is most useful if the desired song or artist is played frequently on one of the genre channels. If the desired song or artist is less frequently played there is no guarantee that the Family Music Center will record the music.

Songs recorded on the Family Music Center can be heard in a number of different fashions. A convenient way to listen to songs on the Family Music Center in a listener's living room is to connect audio out of the Family Music Center to an amplifier and stereo system, and to connect video out to a television. The listener can then choose, either through a front panel interface, or by remote control through a television interface, songs that he would like to listen to. The listener can create play lists, or choose to listen to songs in the order they were played by the broadcast music channel.

In addition to listening to the songs on the Family Music Center, in a preferred embodiment of the present invention, the listener can "check out" a set of songs to a hand-held digital music player, referred to as a "Music Capsule," which can be plugged into one or more docking ports on the Family Music Center. When the listener has finished listening to songs on his Music capsule, he preferably sets his Music Capsule back into a cradle on the Family Music Center. in order to check-in songs that are no longer being listened to on that specific player, and check out new songs for new listening.

In a preferred embodiment of the present invention, the Family Music Center incorporates digital rights management with songs recorded, thereby preventing a listener from freely making unlimited copies of the recorded songs. Preferably, a listener is limited to check out of a specific song to the total number of times that that song was broadcast to the Family Music Center.

In a preferred embodiment of the present invention, the Family Music Center includes a unit having a hard disk for storage of songs, an audio/video encoding and decoding platform, an on screen display component, front panel navigation buttons and scroll wheel, an LCD panel, and various external interfaces including audio/video jacks, USB, Firewire, and power jacks. In addition the main Family Music Center unit preferably includes four sockets that comprise a docking station for four Music Capsules. Preferably, the sockets have leads to both re-charge the Music Capsules and to transfer songs to and from the Music Capsules. The Family Music Center preferably receives analog audio and video from the listener's receiver, and encodes both the audio and video signal in real-time. The video portion of the signal is analyzed in order to extract artist name, song name, and label and year from the video broadcast, for categorization purposes. The analog audio is preferably encoded separately from the video.

There is thus provided in accordance with a preferred embodiment of the present invention a digital music library builder including an analog-to-digital converter for converting analog audio into digital audio, an optical character processor for recognizing characters within an image, a meta-data extractor for identifying meta-data for a song within the recognized characters, an audio parser for marking the start and end of a song within the digital audio, and a database manager for associating the identified meta-data with the marked song, within a digital music library.

There is further provided in accordance with a preferred embodiment of the present invention a method for building a digital music library, including converting analog audio into digital audio, recognizing characters within an image, identifying meta-data for a song within the recognized characters, marking the start and end of a song within the digital audio, and associating the identified meta-data with the marked song, within a digital music library.

There is further provided in accordance with a preferred embodiment of the present invention a computer readable medium containing executable computer program instructions which, when executed on a processing system, cause the processing system to perform a method including converting analog audio into digital audio, recognizing characters within an image, identifying meta-data for a song within the recognized characters, marking the start and end of a song within the digital audio, and associating the identified meta-data with the marked song, within a digital music library.

There is additionally provided in accordance with a preferred embodiment of the present invention an automatic music library builder including a housing including a USB port for transferring data to and from a computer, audio connectors for receiving analog audio, video connectors for receiving a video frame, video frame capture circuitry located within the housing, for capturing a video frame received by the video connecters, an analog to digital audio converter located within the housing, for converting the analog audio to digital audio, an audio digital signal processor located within the housing, for converting the digital audio into a digital music format, and a processor located within the housing, for extracting meta-data for a song from the captured video frame.

There is moreover provided in accordance with a preferred embodiment of the present invention a digital music library builder including an optical character processor for recognizing characters within an image, a meta-data extractor for identifying meta-data for a song within the recognized characters, an audio parser for marking the start and end of a song within a digital audio signal, and a database manager for associating the identified meta-data with the marked song, within a digital music library.

There is further provided in accordance with a preferred embodiment of the present invention a method for building a digital music library, including recognizing characters within an image, identifying meta-data for a song within the recognized characters, marking the start and end of a song within a digital audio signal, and associating the identified meta-data with the marked song, within a digital music library.

There is yet further provided in accordance with a preferred embodiment of the present invention a computer readable medium containing executable computer program instructions which, when executed on a processing system, cause the processing system to perform a method including recognizing characters within an image, identifying meta-data for a song within the recognized characters, marking the start and end of a song within a digital audio signal, and associating the identified meta-data with the marked song, within a digital music library.

There is additionally provided in accordance with a preferred embodiment of the present invention an automatic music library builder including a housing including audio connectors for receiving digital audio, video connectors for receiving a video frame, video frame capture circuitry located within the housing, for capturing a video frame received by the video connectors, an audio digital signal processor located within the housing, for converting the digital audio into a digital music format, and a processor located within the housing, for extracting meta-data for a song from the captured video frame.

There is moreover provided in accordance with a preferred embodiment of the present invention an automatic music library builder including a housing including audio connectors for receiving digital audio, a camera interface for receiving an image from a camera, an audio digital signal processor located within the housing, for converting the digital audio into a digital music format, and a processor located within the housing, for extracting meta-data for a song from the image.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention enables a listener to automatically import songs recorded from a broadcast music station into his digital music library, along with the songs' meta-data required for indexing his library. Using the present invention a listener, with practically no effort, can automatically build a large digital music library with tens of thousands of his choice of songs, all properly indexed for search and retrieval.

Moreover, an additional feature of the present invention enables the listener to select which songs from among those broadcast on the music stations are to be imported into his library, based on one or more of genre, song title, artist, album, length of song, and other criteria.

The present invention concerns a method and system for automatically building digital music libraries, from music channels broadcast through cable and satellite stations. In a preferred embodiment of the present invention, broadcast songs are recorded into a digital music library along with meta-data necessary for indexing and accessing each individual song, and for display while playing the songs. Using the present invention, the digital music library generated from the broadcast music serves as a large library of individual songs, with full search capability.

Figure 1:
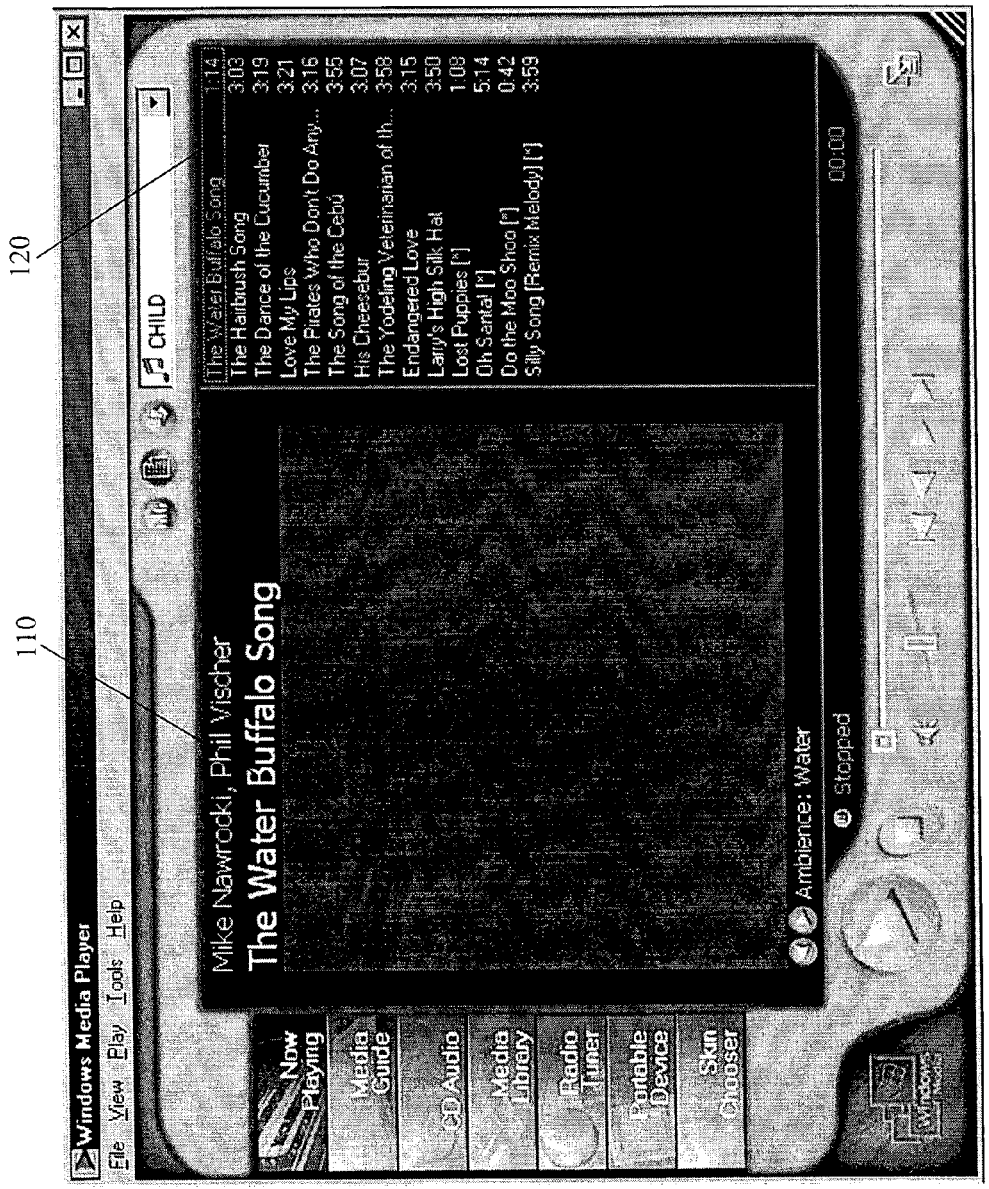
FIG. 1 is a prior art illustration of a user interface for a Windows media player, indicating meta data and an index for accessing individual songs displayed.
Figure 2:
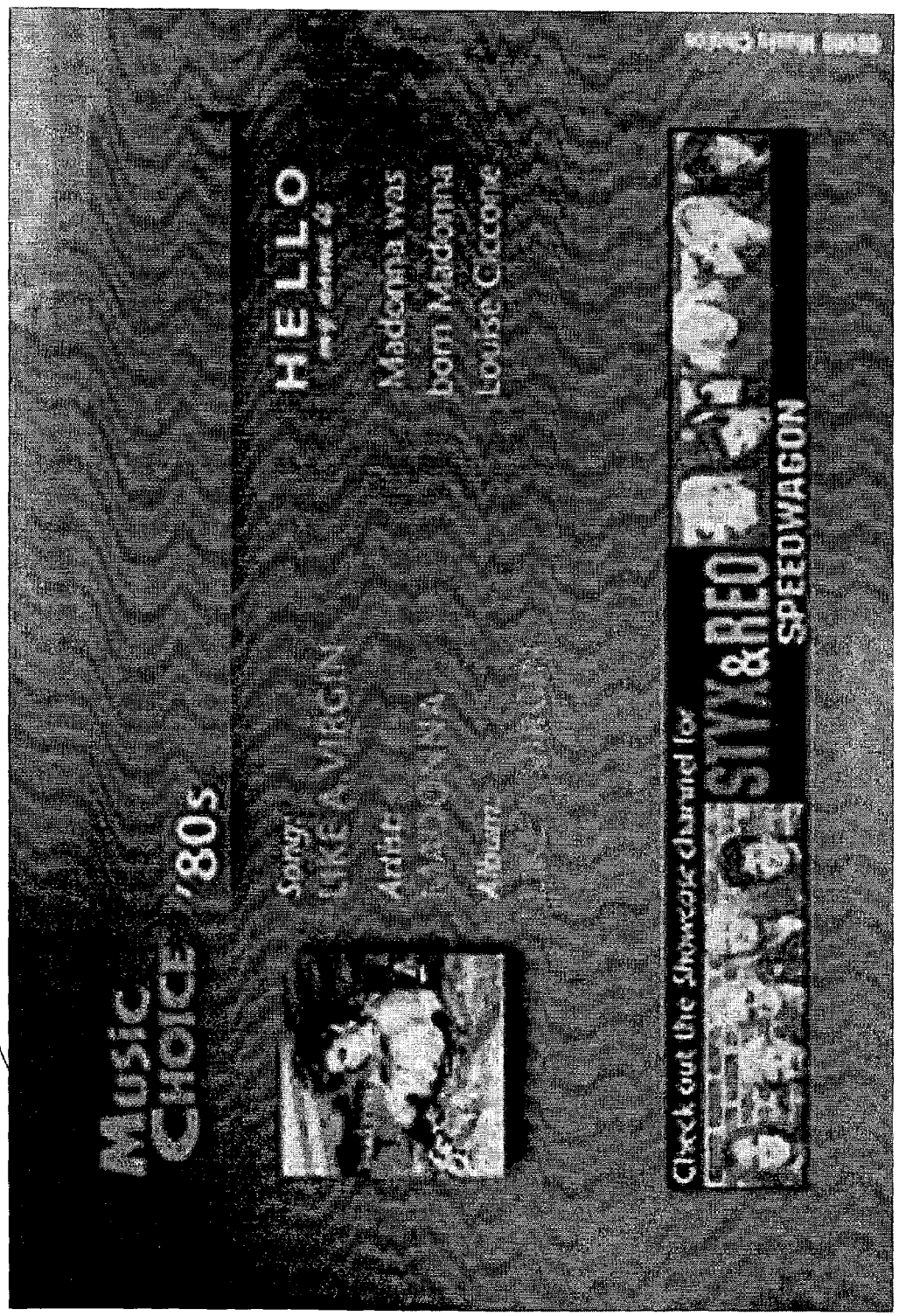
FIG. 2 is a sample video frame displaying meta-data for a song, for processing in accordance with a preferred embodiment of the present invention.

Reference is now made to FIG. 2, which is a sample video frame 210 displaying meta-data for a song, for processing in accordance with a preferred embodiment of the present invention. Video frame 210 is broadcast by satellite to listeners of the "Music Choice" station. Video frame 210 is typically displayed on a listener's television while live music is being broadcast. As shown in FIG. 2, the listener has selected a genre for songs of the 80's, and is currently listening to a song entitled "Like a Virgin" by the artist "Madonna," from an album entitled "Like a Virgin." The various descriptive data associated with a song is referred to as "meta-data;" i.e., descriptive data about the digital audio data itself.

The present invention provides a system that enables the listener to automatically digitally record each broadcast song into a digital music library, and index each song according to genre, song title, artist and album title, as described hereinbelow. Additionally, the present invention enables the listener to pre-select songs to be automatically recorded, by specifying inter alia a genre, song tile or artist, instead of recording all of the broadcast songs. The listener need not be present while the system of the present invention is in operation. It may thus be appreciated that the present invention enables automatic generation of large libraries of songs.

Figure 3:
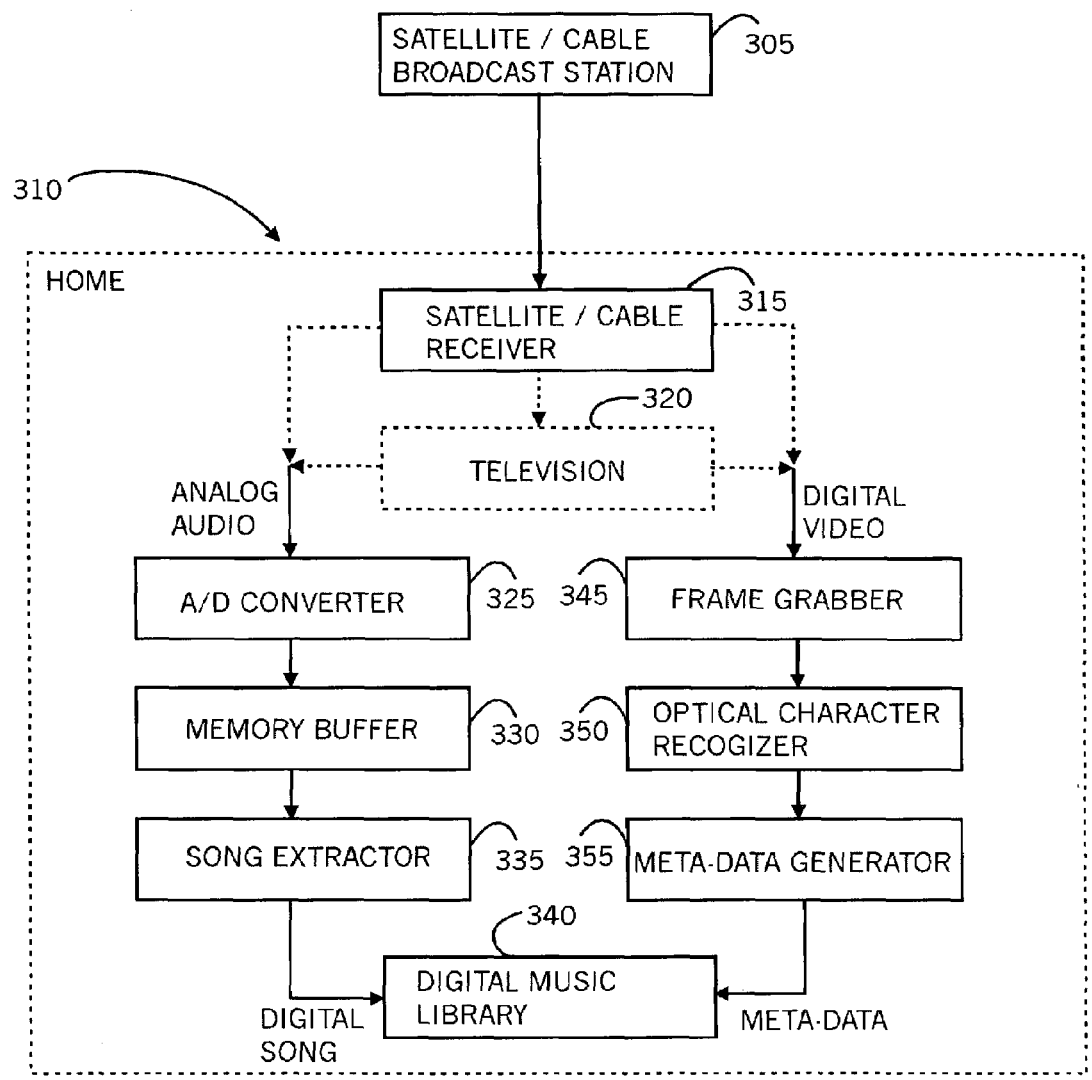
FIG. 3 is a simplified block diagram of a digital music library builder, in accordance with a preferred embodiment of the present invention.

Reference is now made to FIG. 3, which is a simplified block diagram of a digital music library builder, in accordance with a preferred embodiment of the present invention. Shown in FIG. 3 is a broadcast station 305, broadcasting cable or satellite entertainment to a home 310. The broadcast entertainment is received within home 310 by a satellite or cable receiver 315, and played to a home viewer though his television 320, or other display device.

In accordance with a preferred embodiment of the present invention, the audio output of television 320 is converted from analog to digital by an A/D converter 325. The converted digital audio is written to a memory buffer 330. A song extractor 335 analyzes the digital audio and marks the beginnings and ends of individual songs. Preferably, song extractor 335 filters out non-musical portions from the digital audio, such as pure speech. Each such song marked by song extractor 335 is written to a digital music library 340, which is a storage device such as a hard drive, and subsequently flushed from memory buffer 330.

In accordance with a preferred embodiment of the present invention, a video frame grabber 345 captures a video frame being displayed on television 320, such as video frame 210 illustrated in FIG. 2. An optical character recognizer 350 extracts characters from the video frame, such as the characters in video frame 210. A meta-data generator 355 identifies meta-data associated with a current song, within the extracted characters, such as a genre, song title, artist name and album title within video frame 210. The meta-data identified by meta-data generator 355 is then written to digital music library 340, and linked to the corresponding song.

In a preferred embodiment of the present invention, the overall process through which meta-data is extracted from the video portion of the audio/video broadcast is as follows. A number of frames are captured from the video broadcast by station 305, preferably between 10 and 20 frames per song. The captured frames are processed using image processing algorithms, so as to create a clear image of a desired region of the screen. The clarified image is cropped according to a pre-determined template, so as to specify the location of relevant data on the screen. Preferably, such template is generated by analyzing screens from multiple songs, so as to establish a pattern. The resulting cropped image is preferably transformed into a two-tone black and white image. The black and white image is processed through optical character recognizer 350 and relevant meta-data is extracted by meta-data extractor 355.

In a preferred embodiment of the present invention, extracted meta-data is verified with an internal CD database, such as the Gracenote database, to ensure accuracy.

It may be appreciated by those skilled in the art, as indicated in FIG. 3 by use of dashed lines, that the audio signal and video frame may be extracted from cable or satellite receiver 315, instead of from television 320. Furthermore, when cable or satellite receiver 315 includes an optical or coaxial connection for audio out, then digital audio can be extracted directly, without the need for A/D converter 325.

In accordance with a preferred embodiment of the present invention, songs broadcast by station 305 can be selectively imported into digital music library 340, filtered according to meta-data. Criteria based on one or more meta-data including inter-alia genre, song title, artist name, album title and length of song, can be used to filter songs to be imported from among all of the broadcast songs. Preferably, a memory buffer is used to record a song while a determination is being made whether or not to filter the song.

In accordance with a preferred embodiment of the present invention, songs already included within digital music library 340 are not overwritten, unless the listener expressly instructs the system to overwrite.

Figure 4:
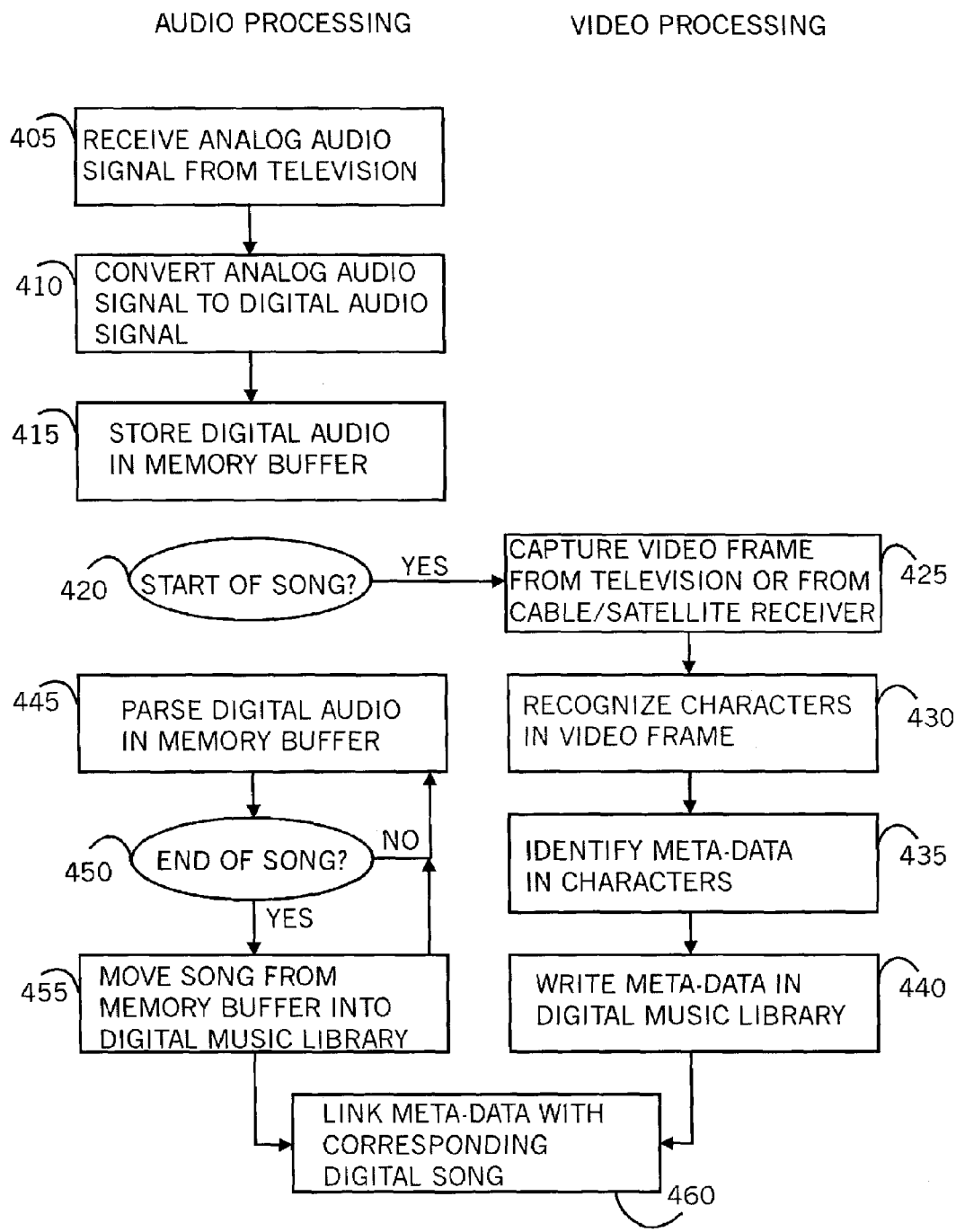
FIG. 4 is a simplified operational flow chart for building a digital music library, in accordance with a preferred embodiment of the present invention.

Reference is now made to FIG. 4, which is a simplified operational flow chart for building a digital music library, in accordance with a preferred embodiment of the present invention. At step 405 an analog audio signal is received from a television. At step 410 the analog signal is converted to digital audio, the digital audio being stored in a memory buffer at step 415.

At step 420 the start of a song is determined, and used to trigger capture of a video frame from a television, or from a cable receiver or from a satellite receiver, at step 425. At step 430 character recognition is applied to recognize characters in the captured video frame, and at step 435 meta-data is identified from the recognized characters. Preferably, a template for the captured video frame is used as an aid in steps 430 and 435. For example, a template corresponding to video frame 210 from FIG. 2 may indicate an area of the image in which relevant meta-data appears. At step 440 the identified meta-data is written to a digital music library.

At step 445 the digital audio stored in the memory buffer is analyzed to mark the beginnings and ends of individual songs. At step 450 the end of a song is determined, which is used to trigger copying the song into the digital music library and subsequently flushing the memory buffer at step 455.

At step 460 the corresponding song and meta-data are linked to one another, so as to index the songs in the digital music library.

Due to interlacing on the television screen, it may be necessary to capture more than one video frame at step 425 in order to be able to extract the meta-data for the song being broadcast. Multiple frames can be averaged in order to enhance the appearance of characters prior to recognition step 430.

Alternatively, to enhance characters prior to recognition step 430, the luminance component of the one or more color video frames can be extracted. Extraction of luminance serves to remove color burst noise that degrades performance of optical character recognition.

It may be appreciated by those skilled in the art that the steps in FIG. 4 may be performed in a different order than as numbered in FIG. 4. Thus steps 405, 410 and 415 for the audio processing may be performed before or after or simultaneous with steps 420, 425, 430, 435 and 440 for the video processing.

The present invention is preferably embodied in a programmable device that can interface with computers, with MP3 players and other digital music players, and with other electronic devices that include MP3 players therewithin including inter alia cell phones, PDAs, home network appliances and Internet appliances. In a first embodiment, the device of the present invention interfaces with satellite/cable receiver 315 (FIG. 3). In a second embodiment, the device of the present invention interfaces with television 320. In a third embodiment, the device of the present invention interfaces with various external components via a USB and a Firewire connection.

In both embodiments, the memory storing digital music library 340 can be either a large hard disk situated within the device itself; or one or more smaller removable memory units such as compact disks and memory cards; or a combination of hard disk and removable memory. The advantage of a large hard disk is that the listener's music library is consolidated into a single library that can be searched and accessed in its entirety. The advantage of removable memory units such as compact disks, is that the listener can insert the disks into portable players such as MP3 players. Assuming that 30 songs on average require 128 MB of data and include one hour's worth of listening, a large 512 GB hard disk can hold a library of approximately 120,000 songs; and a 640 MB compact disk can hold approximately 150 songs, or about 7½ hours worth of listening.

In an alternative embodiment, a device embodying the present invention includes one or more exchange ports, also referred to as "cradles," through which one or more hand-held digital music players can be connected to the device, for loading songs from a digital music library stored on the device thereto. Such exchange ports may be circular ports into which hand-held players in the shape of film canisters are inserted. Thus it may be appreciated that hand-held digital music players, referred to as "Music Capsules" may be "charged up" with songs while they are "plugged into" the device.

Figure 5:
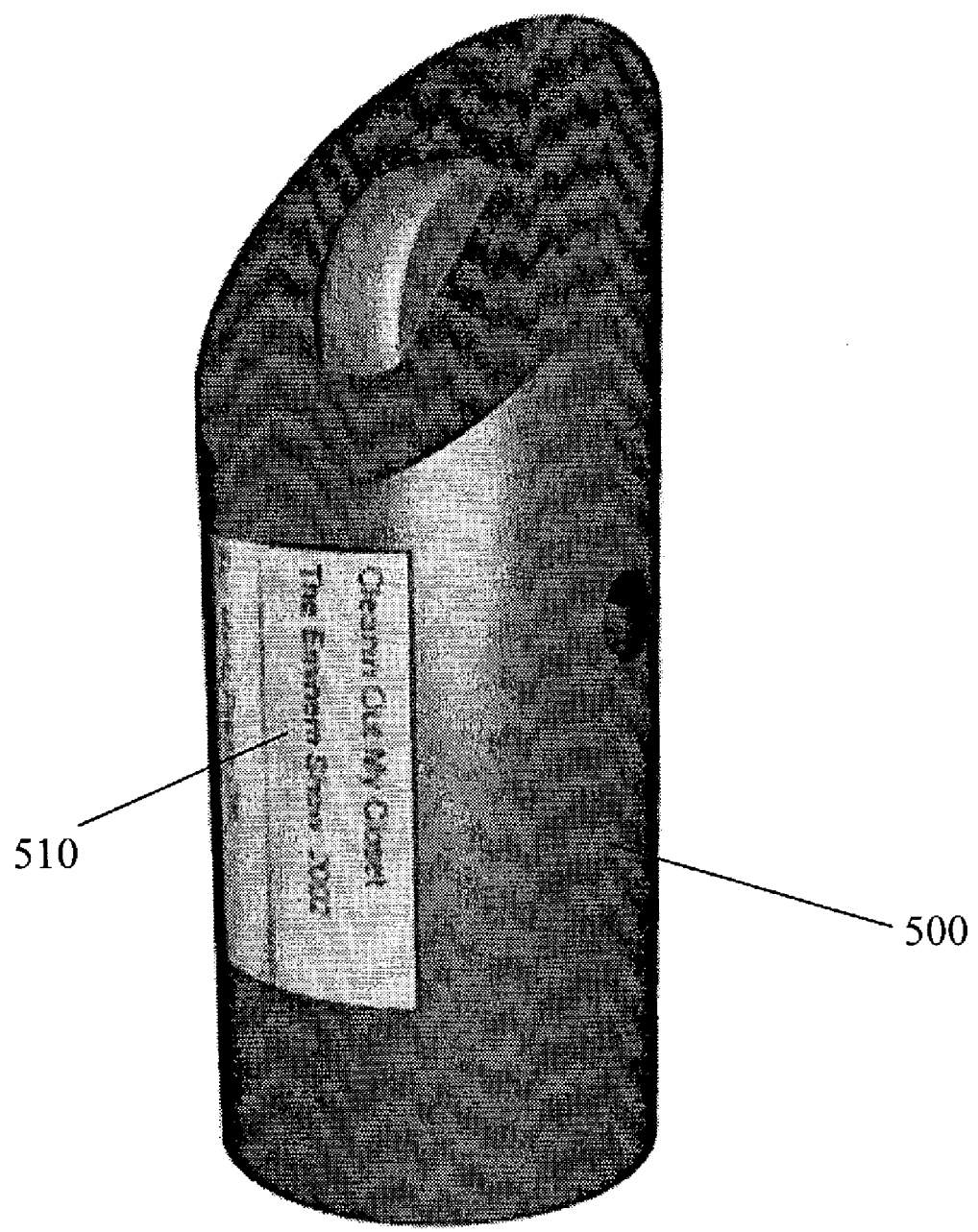
FIG. 5 is a simplified perspective view of a Music Capsule, in accordance with a preferred embodiment of the present invention.

Reference is now made to FIG. 5, which is a simplified perspective view of a Music Capsule, in accordance with a preferred embodiment of the present invention. Shown in FIG. 5 is a hand-held Music Capsule 500 including a user interface 510 displaying meta-data for a song being played. Music Capsule is loaded with songs from Family Music Center, and has serves as a player.

A typical usage scenario for a device embodying the present invention, referred to as a Family Music Center, is as follows. A listener sets his cable or satellite receiver box to a specific radio station, and activates the device to capture songs from one or more music channels. The Family Music Center automatically creates a digital music library and imports the broadcast songs therein. Thereafter, the listener plugs a Music Capsule into the Family Music Center, and loads selected songs from the music library onto the Music Capsule. If the Family Music Center is connected to the listener's home network, then the listener may also pipe music from the Family Music Center into speakers in various rooms.

Figure 6A:
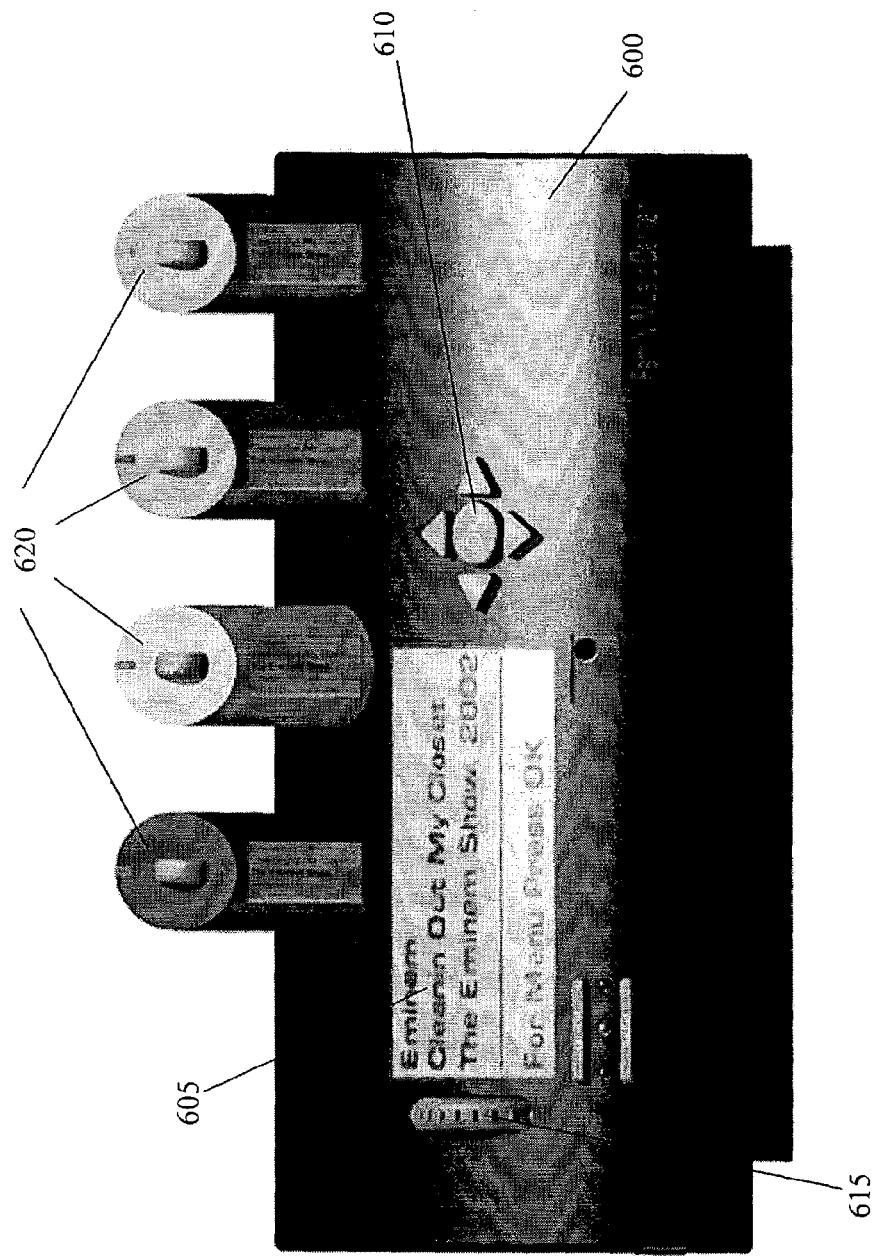
FIGS. 6A–6G are simplified perspective views of a Family Music Center, in accordance with a preferred embodiment of the present invention.
Figure 6B:
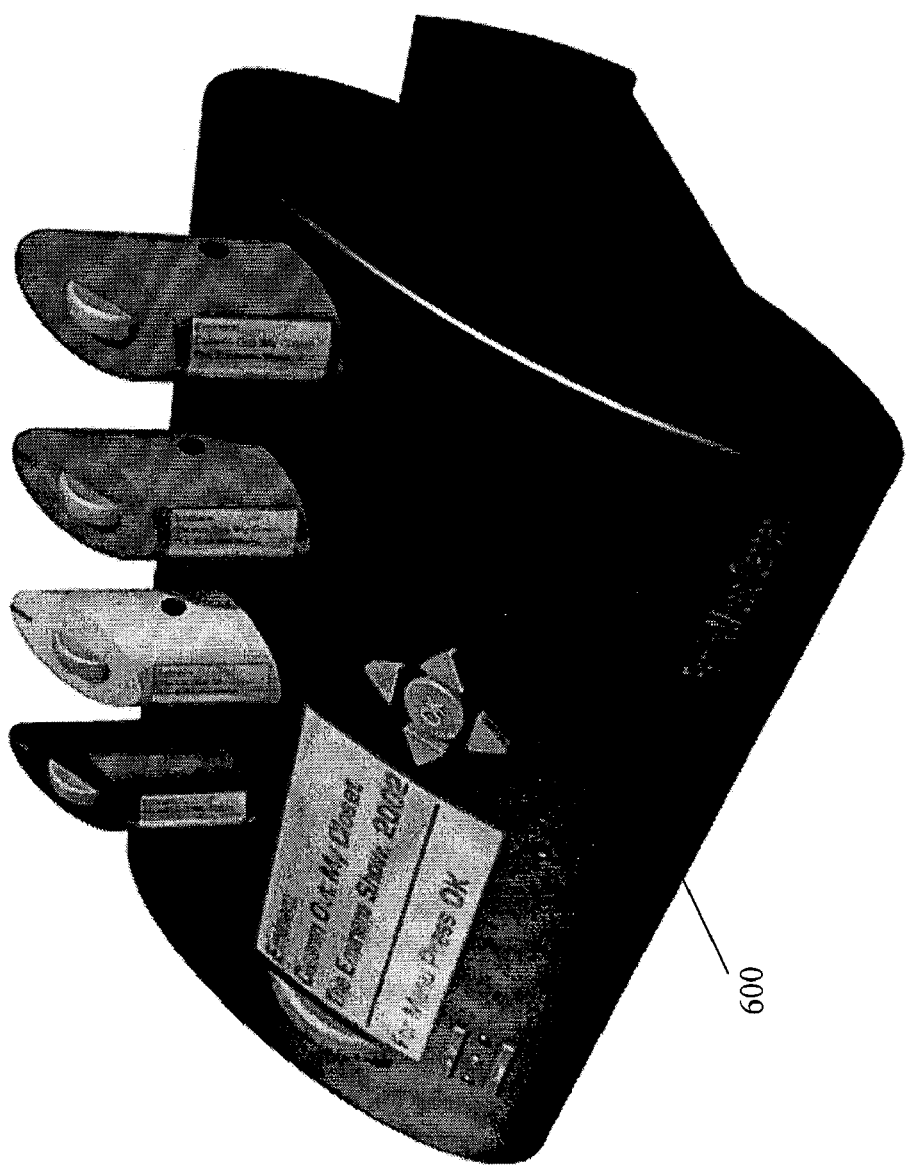
Figure 6C:
Figure 6D:
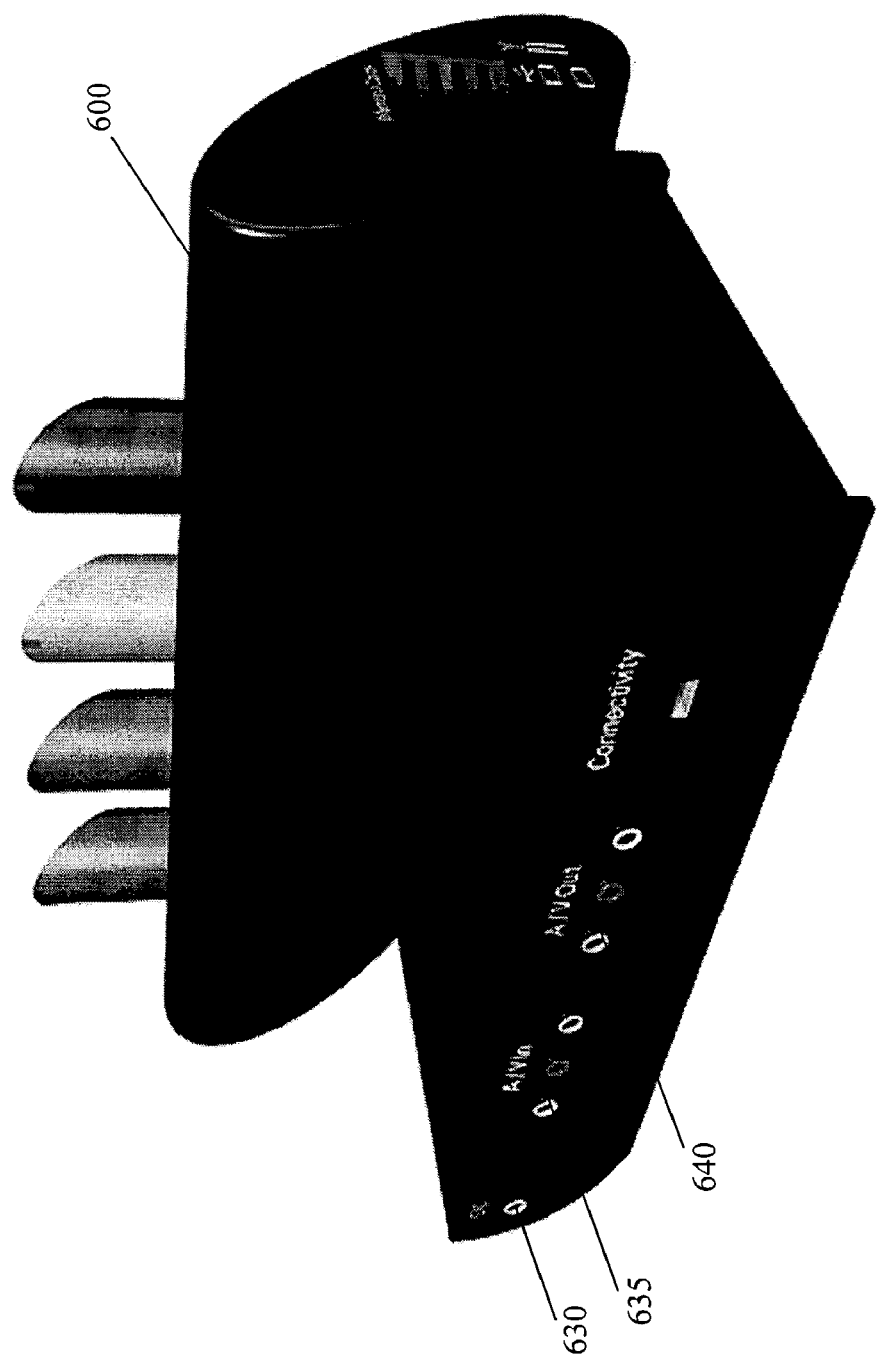
Figure 6E:
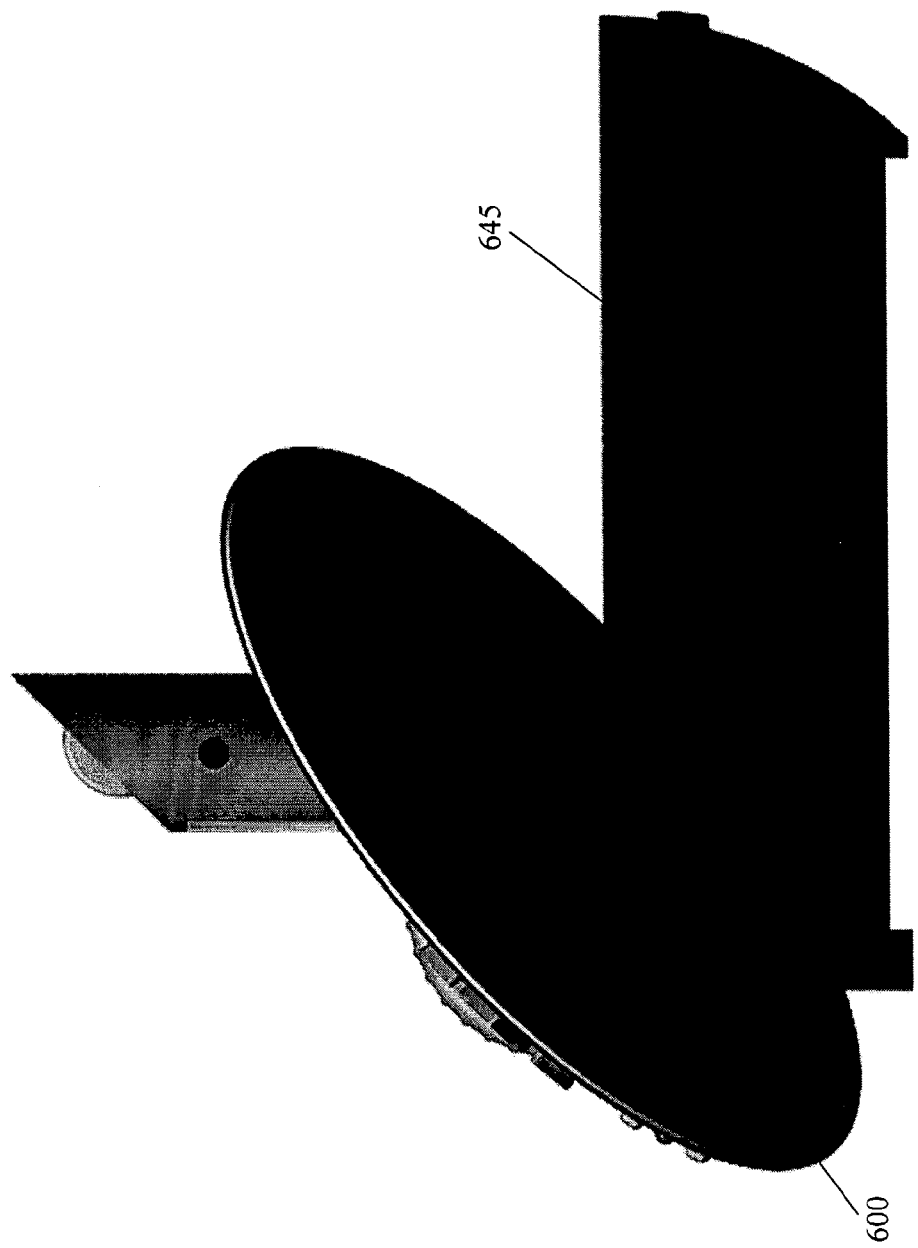
Figure 6F:
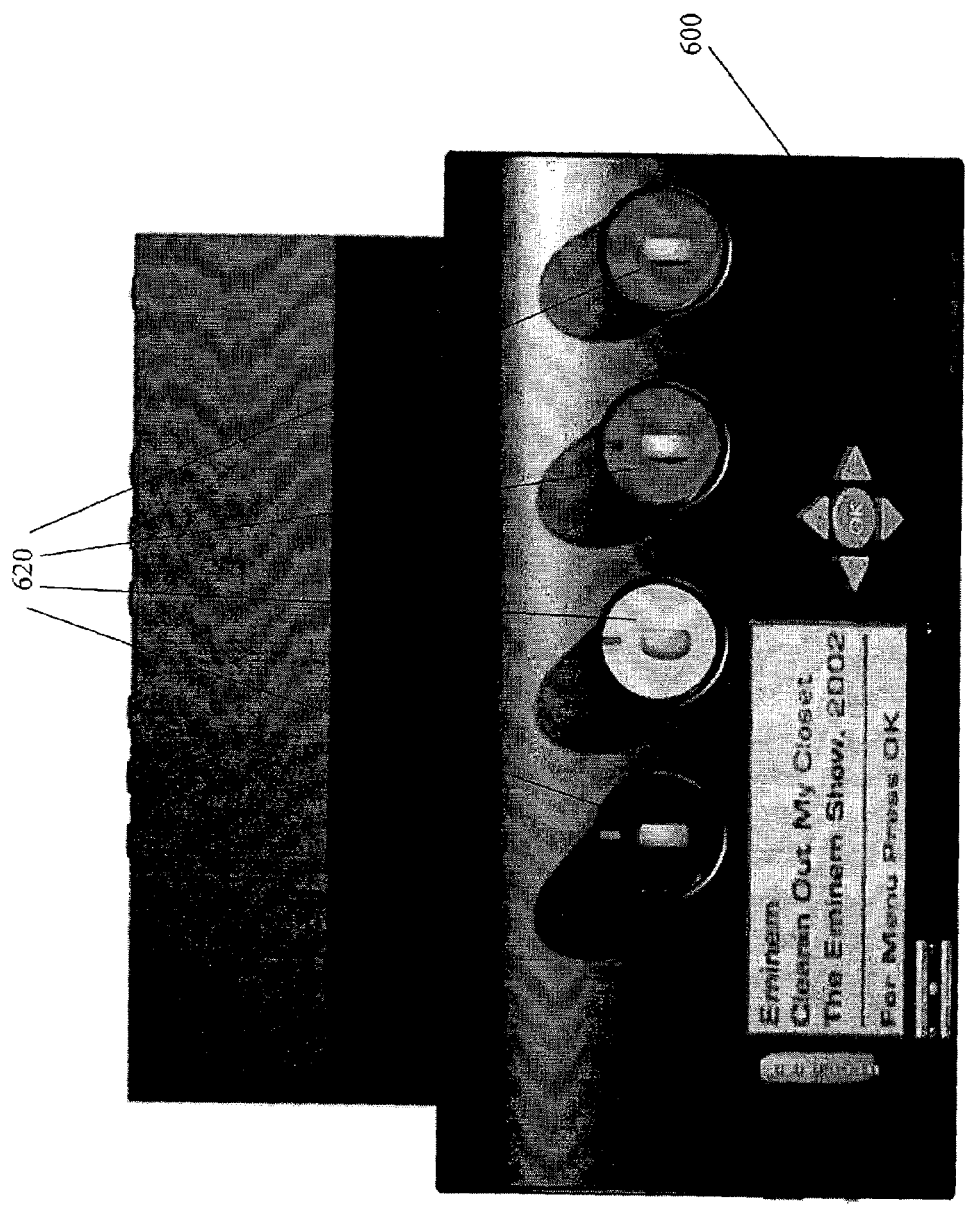
Figure 6G:
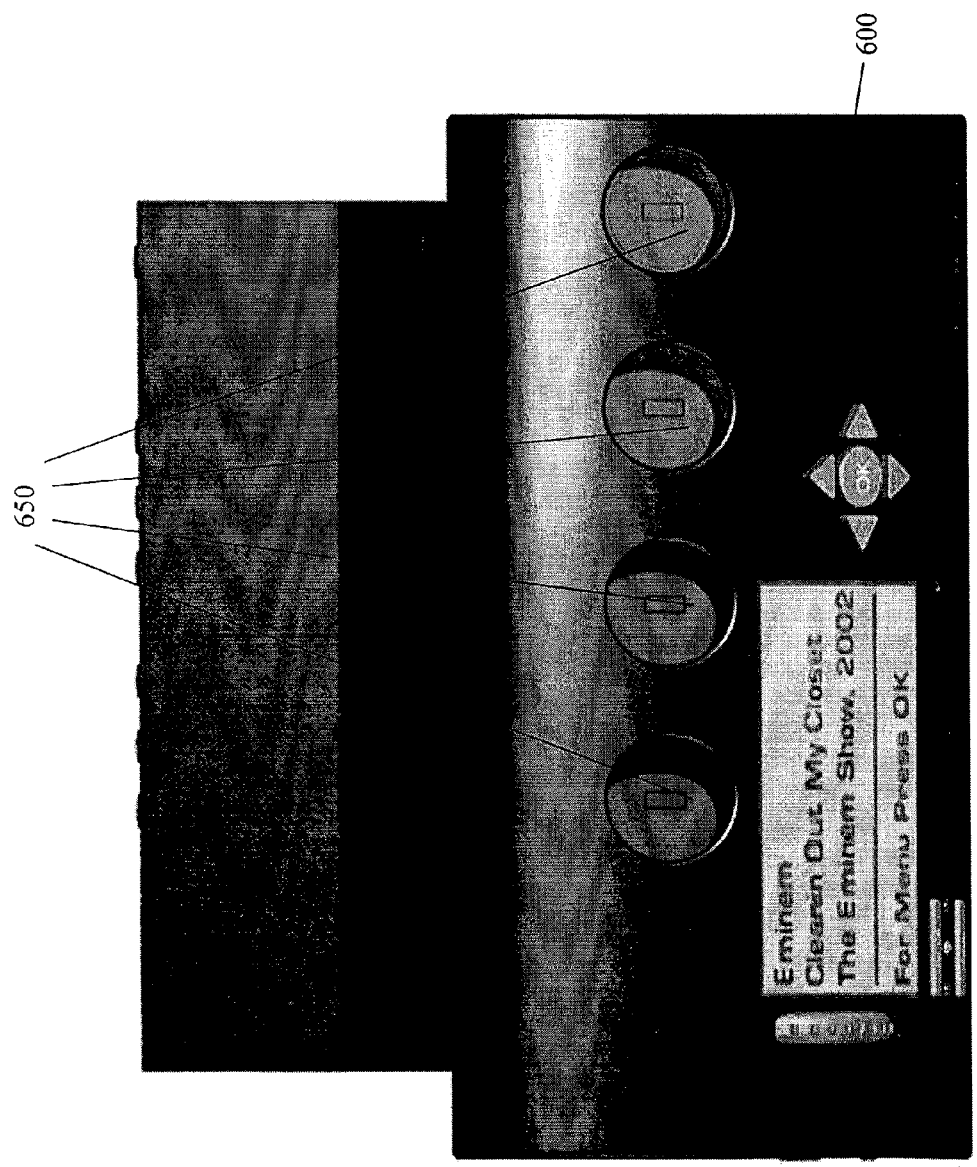

Reference is now made to FIGS. 6A–6G, which are simplified perspective views of a Family Music Center, in accordance with a preferred embodiment of the present invention. FIG. 6A is a front view of a Family Music Center 600, including a user interface display 605 with buttons 610 and scroll wheel 615 for navigation, and including slots for four Music Capsules 620. FIGS. 6B, 6C and 6D are side views of Family Music Center 600. FIG. 6C shows a side of Family Music Center 600 having slots 625 for memory cards. FIG. 6D shows the back of family Music Center 600 with a slot 630 for a DC power supply, slots 635 for audio and video in, and slots 640 for audio and video out. FIG. 6E is a view from the right of Family Music Center 600, indicating a base support 645 for the Family Music Center. FIGS. 6F and 6G are views from the top of Family Music Center 600, with and without Music Capsules 620 inserted into slots 650, respectively.

Preferably, Family Music Center 600 includes one or more of the following components:
1. A USB port, for connecting to a computer;
2. An IEEE 1394 port for connecting to various hardware devices;
3. Slots for removable memory units, such as MF cards, SD cards, memory sticks, compact flash cards and PCMCIA cards;
4. E2PROM to store programming instructions;
5. RAM for capture and processing of digital data;
6. Video capture board with memory for storage;
7. Audio and video connectors in and out;
8. Remote control interface for an infra-red (IR) or radio-frequency (RF) control unit;
9. Analog to digital audio converter;
10. Digital signal processor for converting audio to MP3 format;
11. Connection to power supply, or battery casing; and
12. A display driver for screen display and navigation.

Figure 7:
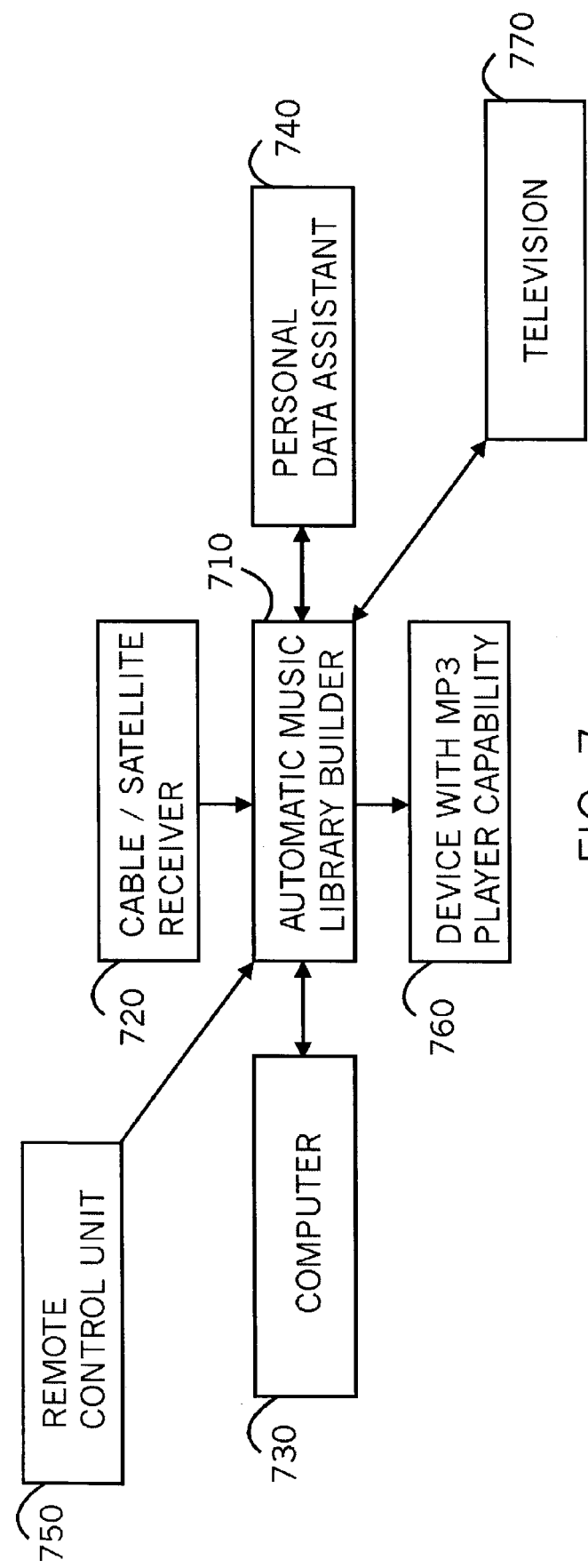
FIG. 7 is a simplified block diagram illustrating interconnectivity of an automatic music library builder with other devices, in accordance with a preferred embodiment of the present invention.

Reference is now made to FIG. 7, which is a simplified block diagram illustrating interconnectivity of an automatic music library builder with other devices, in accordance with a preferred embodiment of the present invention. Shown in FIG. 7 is an automatic music library builder 710, receiving audio and video feed from a cable or satellite receiver 720, receiving broadcast music channels. Music library builder 710 generates an MP3 music database in accordance with a preferred embodiment of the present invention, preferably filtering broadcast songs according to pre-defined listener settings and preferences.

Preferably, music library builder 710 interconnects with a computer 730 and a personal data assistant (PDA) 740. Listener settings and preferences can be set on computer 730 or PDA 740, and loaded therefrom onto music library builder 710. Music library builder 710 can be programmed and controlled using computer 730 or PDA 740. Preferably, music library builder can also be controlled using a remote control unit 750, using an infra-red (IR) or radio frequency (RF) signal.

After automatic music library builder 710 generates a digital music database such as an MP3 database, the database can be transferred to computer 730 or PDA 740 for playback. Alternatively, the database can be transferred to a portable device 760 with MP3 player capability through a removable memory unit such as a compact disk or memory card.

Preferably automatic music library builder 710 includes a user interface, albeit a limited user interface, that enables a listener to select and categorize songs that are automatically imported into his digital music library. In an alternative embodiment of the present invention, a listener can specify his settings on his computer or PDA, and then load them into the device of the present invention using a USB cable or memory medium.

Preferably, the user interface displays the current song, a yes/no indicator, and the cumulative number of songs already recorded. Preferably, the user interface also enables a user to view an index of all songs recorded on the current memory unit, and to view an index of all songs recorded on all memory units.

In an alternate embodiment of the present invention, automatic music library builder 710 uses a television 770 to display a user interface. Preferably automatic library builder 710 includes a video out connector that can be used to connect into television 770. Selections from menu screens displayed on television 770 are preferably made using a control device, such as remote control unit 750, the control device preferably having directional buttons for left-right-up-down and a button for select.

In an enhanced embodiment, the present invention incorporates digital rights management. Specifically, meta-data for a song can also include the number of times the song was played on the broadcast music channel. Such number is preferably used to limit the number of times a listener can access the song from his music library by another digital music player.

In reading the above description, persons skilled in the art will realize that there are many apparent variations that can be applied to the methods and systems described. Thus it may be appreciated that the analog audio and the video frame containing meta-data may be captured from different sources, instead of from a single television. Meta-data for broadcast songs may be available, for example, at a broadcaster's Internet site.

Alternatively, meta-data for broadcast songs may be extracted from a video or still image camera that photographs a display screen of a radio that includes meta-data. For example, XM and Sirius satellite radios display meta-data on their screens. Often broadcasters transmit meta-data in an encrypted form, and thus use of a camera enables determination of meta-data without the need to decrypt an encrypted data stream.

In an alternate embodiment of the present invention, meta-data may be included within a video broadcast, for example, as data within a vertical blanking (VB) channel. For such an embodiment, the present invention obtains meta-data by extraction from the VB channel.

It may be appreciated that the Music Capsules of the present invention may receive digital music from other devices, in addition to the Family Music Center. Thus the Music Capsules may be compatible with kiosks, such as music kiosks located in music distribution stores used for listening to songs prior to purchase.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims.

Accordingly, the specification and drawings are to be regarded in an illustrative rather than a restrictive sense.

What is claimed is:

1. A digital music library builder system comprising:
   an analog-to-digital converter for converting analog audio received from a broadcast source into digital audio;
   an optical character processor for recognizing characters within an image related to the analog audio;
   a meta-data extractor, coupled with said optical character processor, for identifying meta-data for a song within the recognized characters;
   an audio parser, coupled with said analog-to-digital converter, for segmenting the song within the digital audio;
   a memory buffer, coupled with said audio parser, for temporarily recording the song segmented by said audio parser;
   a non-volatile memory for persistently storing a digital music library comprising a plurality of songs and their associated meta-data; and
   a database manager, coupled with said meta-data extractor, said memory buffer and said non-volatile memory, (i) for combining meta-data identified by said meta-data extractor from said image, with songs segmented asynchronously by said audio parser from said digital audio, by determining which meta-data corresponds to which songs, and by associating identified meta-data with segmented songs; (ii) for conditionally copying individual songs from the memory buffer and their associated meta-data into the digital music library, depending on whether or not the meta-data satisfies at least one preset filter criterion, (iii) for maintaining counters that indicate the number of times the same song is received from the broadcast source, and (iv) for storing the counters with the songs in the digital music library.

2. The digital music library builder system of claim 1 wherein said optical character processor recognizes characters with the aid of a template describing the general layout of the image.

3. The digital music library builder system of claim 1 wherein the digital music library is structured as a file system.

4. The digital music library builder system of claim 1 wherein the digital music library is structured as a database.

5. The digital music library builder system of claim 4 wherein the digital music library is an MP3 database.

6. The digital music library builder system of claim 4 wherein the digital music library comprises WMA files.

7. The digital music library builder system of claim 1 wherein the digital music library resides in a removable memory unit.

8. The digital music library builder system of claim 1 wherein the digital music library resides in a hard disk drive.

9. The digital music library builder system of claim 1 wherein the meta-data includes a song title.

10. The digital music library builder system of claim 1 wherein the meta-data includes an artist.

11. The digital music library builder system of claim 1 wherein the meta-data includes a genre.

12. The digital music library builder system of claim 1 wherein the meta-data includes an album.

13. The digital music library builder system of claim 1 wherein the meta-data includes a song length.

14. The digital music library builder system of claim 1 wherein the meta-data includes a date.

15. The digital music library builder system of claim 1 further comprising a digital rights manager for restricting access to the song, based on the counter corresponding to the song.

16. The digital music library builder system of claim 1 wherein said meta-data extractor determines from said meta-data for a song whether the song already exists within the digital music library.

17. The digital music library builder system of claim 1 wherein the analog audio and the image are obtained from the same source.

18. The digital library builder system of claim 17 wherein the analog audio and the image are obtained from a television.

19. The digital music library builder system of claim 1 wherein the analog audio and the image are obtained from different sources.

20. The digital music library builder system of claim 19 wherein the image is obtained from an Internet site.

21. The digital music library builder system of claim 19 further comprising a camera that captures a photograph from a radio display, and wherein the image is obtained from the captured photograph.

22. The digital music library builder system of claim 1 further comprising a character enhancer for enhancing the characters within the image.

23. The digital music library builder system of claim 22 wherein said character enhancer extracts a luminance color component from the image.

24. The digital music library builder system of claim 22 wherein said character enhancer averages a plurality of images.

25. A method for building a digital music library, comprising:
   converting analog audio received from a broadcast source into digital audio;
   recognizing characters within an image;
   identifying meta-data for a song within the recognized characters;
   segmenting a song within the digital audio;
   recording the song into a temporary memory buffer;
   combining meta-data identified by said identifying, with songs segmented asynchronously by said segmenting, comprising:
      determining which meta-data corresponds to which songs;
      associating identified meta-data with segmented songs; and
      conditionally copying individual songs from the memory buffer and their associated meta-data into a digital music library, depending on whether or not the meta-data satisfies at least one preset filter criterion; and
   maintaining counters that indicate the number of times the same song is received from the broadcast source, wherein said conditionally copying stores the counters with the songs in the digital music library.

26. The method of claim 25 wherein said recognizing recognizes characters with the aid of a template describing the general layout of the image.

27. The method of claim 25 wherein the digital music library is structured as a file system.

28. The method of claim 25 wherein the digital music library is structured as a database.

29. The method of claim 28 wherein the digital music library is an MP3 database.

30. The method of claim 28 wherein the digital music library comprises WMA files.

31. The method of claim 25 wherein the meta-data includes a song title.

32. The method of claim 25 wherein the meta-data includes an artist.

33. The method of claim 25 wherein the meta-data includes a genre.

34. The method of claim 25 wherein the meta-data includes an album.

35. The method of claim 25 wherein the meta-data includes a song length.

36. The method of claim 25 wherein the meta-data includes a date.

37. The method of claim 25 further comprising restricting access to the song, based on the counter corresponding to the song.

38. The method of claim 25 further comprising determining from said meta-data for a song whether the song already exists within the digital music library.

39. The method of claim 25 wherein the analog audio and the image are obtained from the same source.

40. The method of claim 39 wherein the analog audio and the image are obtained from a television.

41. The method of claim 25 wherein the analog audio and the image are obtained from different sources.

42. The method of claim 41 wherein the image is obtained from an Internet site.

43. The method of claim 41 further comprising capturing a photograph of a radio display, and wherein the image is obtained from the captured photograph.

44. The method of claim 25 further comprising enhancing characters within the image prior to said recognizing characters.

45. The method of claim 44 wherein said enhancing characters comprises extracting a luminance color component from the image.

46. The method of claim 44 wherein said enhancing characters comprises averaging a plurality of images.

47. A computer readable storage medium containing executable computer program instructions which, when executed on a processing system, cause the processing system to perform a method comprising:
converting analog audio into digital audio;
recognizing characters within an image;
identifying meta-data for a song within the recognized characters;
recording the song into a temporary memory buffer; and
combining meta-data identified by said identifying, with songs segmented asynchronously by said segmenting, comprising:
determining which meta-data corresponds to which songs;
associating identified meta-data with segmented songs; and
conditionally copying individual songs from the memory buffer and their associated meta-data into a digital music library, depending on whether or not the meta-data satisfies at least one preset filter criterion; and
maintaining counters that indicate the number of times the same song is received from the broadcast source, wherein the conditionally copying stores the counters with the songs in the digital music library.

48. A digital music library builder system comprising:
an optical character processor for recognizing characters within an image related to a song;
a meta-data extractor, coupled with said optical character processor, for identifying meta-data for a the song within the recognized characters;
an audio parser for segmenting the song within a digital audio signal;
a memory buffer, coupled with said audio parser, for temporarily recording the song segmented by said audio parser;
a non-volatile memory for persistently storing a digital music library comprising a plurality of songs and their associated meta-data; and
a database manager, coupled with said meta-data extractor, said memory buffer and said non-volatile memory, (i) for combining meta-data identified by said meta-data extractor from said image, with songs segmented asynchronously by said audio parser from said digital audio, by determining which meta-data corresponds to which songs, and by associating identified meta-data with segmented songs; (ii) for conditionally copying individual songs from the memory buffer and their associated meta-data into the digital music library, depending on whether or not the meta-data satisfies at least one preset filter criterion, (iii) for maintaining counters that indicate the number of times the same song is received from the broadcast source, and (iv) for storing the counters with the songs in the digital music library.

49. The digital music library builder system of claim 48 wherein the digital audio signal is obtained from a cable broadcast receiver.

50. The digital music library builder system of claim 48 wherein the digital audio signal is obtained from a satellite broadcast receiver.

51. The digital music library builder system of claim 48 wherein the image is obtained from a cable broadcast receiver.

52. The digital music library builder system of claim 48 wherein the image is obtained from a television.

53. The digital music library builder system of claim 48 wherein the image is obtained from an Internet web page.

54. The digital music library builder system of claim 48 wherein the image is obtained from a camera.

55. The digital music library builder system of claim 48 further comprising a music player exchange port for loading selected songs from the digital music library into a music player.

56. A method for building a digital music library, comprising:
recognizing characters within an image;
identifying meta-data for a song within the recognized characters;
segmenting a song within a digital audio signal;
recording the song into a temporary memory buffer;
combining meta-data identified by said identifying, with songs segmented asynchronously by said segmenting, comprising:
determining which meta-data corresponds to which songs;
associating identified meta-data with segmented songs; and
conditionally copying individual songs from the memory buffer and their associated meta-data into a digital music library, depending on whether or not the meta-data satisfies at least one preset filter criterion; and maintaining counters that indicate the number of times the same song is received from the broadcast source, wherein said conditionally copying stores the counters with the songs in the digital music library.

57. The method of claim 56 further comprising obtaining the digital audio signal from a cable broadcast receiver.

58. The method of claim 56 further comprising obtaining the digital audio signal from a satellite broadcast receiver.

59. The method of claim 56 further comprising obtaining the image from a cable broadcast receiver.

60. The method of claim 56 further comprising obtaining the image from a television.

61. The method of claim 56 further comprising obtaining the image from an Internet web page.

62. The method of claim 56 further comprising obtaining the image from a camera.

63. The method of claim 56 further comprising loading selected songs from the digital music library into a music player.

64. A computer readable storage medium containing executable computer program instructions which, when executed on a processing system, cause the processing system to perform a method comprising:
recognizing characters within an image;
identifying meta-data for a song within the recognized characters;
segmenting a song within a digital audio signal; and
recording the song into a temporary memory buffer;
combining meta-data identified by said identifying, with songs segmented asynchronously by said segmenting, comprising:
determining which meta-data corresponds to which songs;
associating identified meta-data with segmented songs; and
conditionally copying individual songs from the memory buffer and their associated meta-data into a digital music library, depending on whether or not the meta-data satisfies at least one preset filter criterion; and
maintaining counters that indicate the number of times the same song is received from the broadcast source, wherein the conditionally copying stores the counters with the songs in the digital music library.

65. An automatic music library builder system comprising:
a housing comprising:
audio connectors for receiving a stream of digital audio, the digital audio including songs being played by a radio, the radio having a display screen for displaying meta-data for songs currently being played;
a camera interface for capturing an image from the radio display screen;
a memory buffer located within said housing, for temporarily storing the digital audio;
a non-volatile memory for persistently storing a digital music library comprising a plurality of songs and their associated meta-data;
an audio digital signal processor located within said housing and coupled with said audio connectors, for converting the digital audio into a digital music format; and
a processor located within said housing and coupled with said camera interface and said non-volatile memory, (i) for automatically extracting meta-data for a song from the image, (ii) for conditionally copying the converted digital audio from said memory buffer and the extracted meta-data into the digital music library, depending on whether the extracted meta-data satisfies at least one preset filtering criterion, (iii) for maintaining counters that indicate the number of times the same song is received from the broadcast source, and (iv) for storing the counters with the songs in the digital music library.

66. The automatic music library builder system of claim 65 wherein the image captured by the camera interface is a digital image.

67. The automatic music library builder system of claim 65 wherein the image captured by the camera interface is an analog image, the automatic music library builder further comprising an analog to digital image converter, for converting the analog image into a digital image.

68. The automatic music library builder system of claim 65 wherein the camera interface uses a still image camera.

69. The automatic music library builder system of claim 65 wherein the camera interface uses a video camera, and the image is a video frame.

* * * * *